(12) United States Patent
Hickerson

(10) Patent No.: US 11,511,139 B2
(45) Date of Patent: Nov. 29, 2022

(54) POWER DOOR OPENER

(71) Applicant: Snap-on Incorporated, Kenosha, WI (US)

(72) Inventor: William Hickerson, Hardyston, NJ (US)

(73) Assignee: Snap-on Incorporated, Kenosha, WI (US)

(*) Notice: Subject to any disclaimer, the term of this patent is extended or adjusted under 35 U.S.C. 154(b) by 62 days.

(21) Appl. No.: 16/547,467

(22) Filed: Aug. 21, 2019

(65) Prior Publication Data

US 2020/0030641 A1 Jan. 30, 2020

Related U.S. Application Data

(63) Continuation of application No. 16/049,665, filed on Jul. 30, 2018, now Pat. No. 10,413,759, which is a continuation of application No. 14/996,430, filed on Jan. 15, 2016, now abandoned, which is a continuation of application No. 14/526,648, filed on Oct. 29, 2014, now Pat. No. 9,238,154, which is a continuation of application No. 13/488,716, filed on Jun. 5, 2012, now Pat. No. 8,899,553.

(51) Int. Cl.
*A62B 3/00* (2006.01)
*B60C 25/02* (2006.01)

(52) U.S. Cl.
CPC ............ *A62B 3/005* (2013.01); *B60C 25/025* (2013.01)

(58) Field of Classification Search
CPC .......... A62B 3/005; B60C 25/025; B27L 7/00
USPC .................. 254/133 R, 133 A, 134
See application file for complete search history.

(56) References Cited

U.S. PATENT DOCUMENTS 3,038,510 A * 6/1962 Vorkoeper ................ B27L 7/00
                                                    144/34.1
3,081,066 A * 3/1963 Murawski ................ B66F 3/36
                                                    254/93 R
3,426,752 A * 2/1969 Laico ...................... A61F 15/02
                                                    606/53

(Continued)

FOREIGN PATENT DOCUMENTS

WO     2006054141 A1      5/2006

OTHER PUBLICATIONS

European Search Report for Application No. 19204611.8 dated Feb. 10, 2020, 8 pages.

*Primary Examiner* — Seahee Hong
(74) *Attorney, Agent, or Firm* — Seyfarth Shaw LLP

(57) ABSTRACT

A power door opener including an actuator having a housing with an electrically powered actuator shaft that can be extended from a closed to an extended position. In one embodiment, a movable push plate is affixed to the actuator shaft and a fixed push plate is fixed in its position with respect to the housing. In the closed position of the actuator shaft, the fixed and movable push plates are aligned to form a combined edge for insertion into the space between a door and door jamb. The actuator shaft extends to move the movable push plate apart from the fixed push plate to spread the space and release the door from the door jamb. Alternatively, a double ended power door opener is located between opposite door jambs and the extending of the actuator shaft forces the door jambs apart to release the door from the door jamb to force open the door.

17 Claims, 4 Drawing Sheets

(56) References Cited

U.S. PATENT DOCUMENTS

| | | | | | |
|---|---|---|---|---|---|
| 3,762,688 | A | * | 10/1973 | Leonhardt | A62B 3/005 254/133 R |
| 4,657,225 | A | * | 4/1987 | Hoehn | A62B 3/005 72/705 |
| 4,736,927 | A | * | 4/1988 | Clancy | B25B 5/102 254/93 H |
| 4,762,304 | A | * | 8/1988 | Hill | A62B 3/005 254/100 |
| 4,783,053 | A | * | 11/1988 | Yirmiyahu | A62B 3/005 254/104 |
| 5,678,293 | A | * | 10/1997 | Sturdevant | A62B 3/005 29/254 |
| 5,987,723 | A | * | 11/1999 | McNally | A62B 3/005 173/141 |
| 6,000,680 | A | * | 12/1999 | Kimura | B23D 29/00 254/93 R |
| 7,337,515 | B2 | * | 3/2008 | Phillips | A62B 3/00 269/3 |
| 7,434,785 | B1 | * | 10/2008 | McMorrow | A62B 3/005 254/134 |
| 7,490,813 | B1 | * | 2/2009 | Weddle | A62B 3/005 248/354.1 |
| 8,485,508 | B1 | * | 7/2013 | Newman | A62B 3/005 254/419 |
| 9,841,361 | B2 | * | 12/2017 | Perrone | G01M 99/007 |
| 10,166,414 | B1 | * | 1/2019 | Thaw | B66F 11/00 |
| 10,912,958 | B1 | * | 2/2021 | Nakash | A62B 3/005 |
| 2001/0052592 | A1 | * | 12/2001 | Alvarado | B66F 3/18 254/13 |
| 2008/0093587 | A1 | | 4/2008 | Sodini | |
| 2013/0320278 | A1 | * | 12/2013 | Hickerson | A62B 3/005 254/133 R |

* cited by examiner

POWER DOOR OPENER

CROSS-REFERENCE TO RELATED APPLICATIONS

This application is a continuation application of U.S. patent application Ser. No. 16/049,665 filed Jul. 30, 2018, the entire disclosure of which is incorporated herein by reference in its entirety.

BACKGROUND OF THE INVENTION

The present invention relates to a door opener and, more particularly, to a power door opener that allows a user to force open a door with enhanced safety and reduced noise.

In the law enforcement and fire services, first responders arriving at the destination are often faced with locked doors barring ready access to a building or room within a building. In the case of firefighters, the increasing use of security locks and metal doors require firefighters to carry pry bars, axes, sledge hammers and even hydraulic tools to force doors open. As is known, the time required to force a door open for the firefighter to gain access to a potentially dangerous fire is critical as the danger of injury to a firefighter increases as the fire is allowed to continue unabated such that the faster the firefighter can attack the fire, the better the outcome with greater safety to the firefighter.

In addition, with many fires in a closed room or confined area, the fire can be starving for oxygen and the opening of the door allows air into the room and the fire tends to blow back in the direction of the open door toward the source of the oxygen, thereby putting any personnel positioned in the doorway at great risk. It is therefore a danger to a fireman to be positioned within the doorway of a door as it is being opened to access a fire within the closed room.

In the case of law enforcement, in addition to the tools use by the fire department, law enforcement personnel sometimes use battering rams. When the officers use a battering ram, they can be exposed to danger since the user of the battering ram normally must stand in front of the door. This danger is increased if the door is not opened on the first try such that any occupants are alerted to the fact of the law enforcement officers attempting to gain entry into the room and can take measures, possible deadly, to repel any entry into the room by the law enforcement personnel.

Another method commonly used to force open a door is by using a manually pumped hydraulic ram. With the hydraulic ram, the ram is inserted in the space between the door and the door jamb in the vicinity of the lock and the hydraulic ram forces the door jamb apart such that the jamb is displaced away from the door sufficiently to disengage the lock and allow the door to be opened. With this method, the user is required to hand pump the tool until the door is spread enough to force it open. Again, during the process, the user is exposed to danger from the occupiers inside the premises.

Accordingly, the use of the hydraulic ram is useful for flush doors where the tool can be inserted into the space between the door and the door jamb but is extremely difficult to use if the door is flush to the inside leaving a 4-6 inch recess between the outside door sill and the door.

In addition the military also has a need to open a locked door in gaining access to a building or room and, using a battering ram or hydraulic tool, there is the addition danger that if the ram does not work to open the door on the first try, the occupants inside the room are warned and can react by firing weapons through the door in an attempt to thwart the entry by the military personnel, thereby creating a dangerous situation to those attempting to gain entry.

Accordingly, it would be advantageous to have a door opener that could be used to force the opening of a door where the use of the door opener could be relatively quiet so as to avoid alerting the occupants of the room and which also can allow the personnel attempting to open the door to be physically located aside the door and not directly in front of the door at the time the entry is attempted.

SUMMARY OF THE INVENTION

Now, in accordance with the present invention, there is a power door opener that has a power actuator that is basically a housing having an actuator shaft movable with respect to the housing between a closed position and extended position where the actuator shaft is extended outwardly from the housing. An electric motor and associated gear train cause the actuator shaft to move between its closed and extended positions.

A fixed push plate is affixed to the housing and may be affixed by screw threads, welding or other means of affixation. The fixed push plate is preferable cylindrical and surrounds the actuator shaft and has a distal end with a fixed pry member that extends radially outwardly from the fixed push plate. The fixed pry member is preferably tapered inwardly in the outward direction.

A movable push plate is affixed to the end of the actuator shaft and moves therewith and also has a movable pry member that extends outwardly therefrom. When the actuator shaft is in its closed position, the fixed and movably pry members are in alignment and form a tapered inwardly combined linear edge that is suitable for inserting into the space between a door and a doorjamb.

In the method of using the power door opener to force open a door, the combined edge of the fixed and movable pry members are inserted into that space between the door and the door jamb and the motor is activated to move the actuator shaft and the movable push plate outward to progressively separate the movable push plate from the fixed push plate, thereby increasing the width of the space between the door and the door jamb sufficiently to disengage the door latch or locking mechanism from the doorjamb and enable the door to be forced open.

In an alternate embodiment, the power door opener is double ended and the power actuator has a front side and a rear side. An extension is affixed to the rear side of the power actuator that extends outwardly from the rear side a predetermine length to its distal end. As such the double ended power door opener can span between the two vertical door jambs with the distal end of extension contacting one of the door jambs and the movable push plate contacting the other door jamb.

Again, as the motor is activated, the actuator shaft moves outwardly to its extended position, thereby increasing the distance between the distal end of the extension and the movable push plate so as to force the door jambs outward sufficiently to disengage the door latch or lock from the door jamb and enable the user to force open the door.

With this embodiment there may be more than one extension provided with the door opener such that the user can interchange one door extension for another. The door extensions can be of different lengths such that the user can select the appropriate extension based on the width or distance between the opposite door jambs.

Other features of the present door opener will become more apparent in light of the following detailed description of a preferred embodiment thereof and as illustrated in the accompanying drawings.

DETAILED DESCRIPTION OF THE INVENTION

Figure 1:
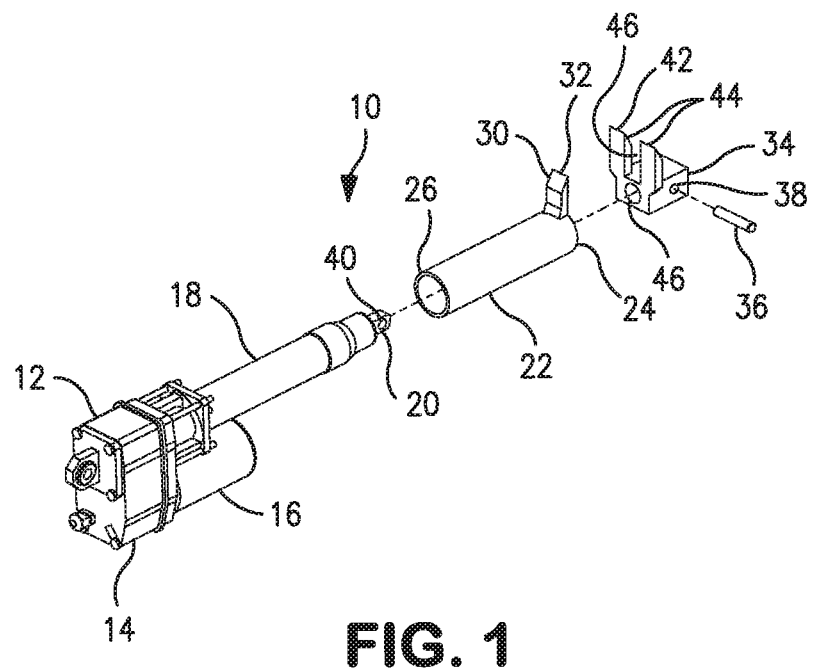
FIG. 1 is an exploded view of an exemplary embodiment of the power door opener of the present invention.

Referring now to FIG. 1, there is shown an exploded view of a power door opener 10 constructed in accordance with the present invention. As can be seen, the power door opener 10 is comprised of a power actuator 12 that is commercially available, for example, from Burr Engineering of Battle Creek, Michigan. The power actuator 12 is basically a housing 14 containing a 12 volt motor 16 and the necessary gearing and power train and an outer cylindrical tube 18 extending outwardly from the housing 14 within which there is a movable actuator shaft 20.

In the operation of the conventional power actuator 12, the actuator shaft 20 can be moved between its closed position as shown in FIG. 1 and an extended position (not shown) where the actuator shaft 20 is extended linearly outwardly from the housing 14. Typically, the actuator shaft 20 can be moved about 4 inches in its movement between the closed position and the extended position and that movement is driven in both directions by the motor 16.

In accordance with the present invention, therefore, a cylindrical fixed push plate 22 is positioned over the outer cylindrical tube 18 with the fixed push plate 22 having a distal end 24 and proximal end 26. The proximal end 26 is affixed to the housing 14 by means of screw threads, welding or other affixation method such that the fixed push plate 22 is firmly affixed to the housing 14 in its position surrounding the outer cylindrical tube 18.

At the distal end 24 of the fixed push plate 22, there is a fixed pry member 30 that extends radially outwardly from the fixed push plate 22 and the fixed pry member 30 tapers inwardly in the outward direction forming a relatively straight, narrow edge 32 at the outer end thereof. As shown the inward taper is formed on fixed pry member 30 on the side away from the distal end 24 of the fixed pry member 30, however, the location of the taper may be on either side of the fixed pry member 30 or on both sides thereof.

A movable push plate 34 is affixed to the outer end of the movable actuator shaft 20 by means such as a pin 36 that extends through a suitable opening 38 in the movable push plate 34 and a corresponding, aligned opening 40 in the outer end of the actuator shaft 20, thereby securing the movably push plate 34 firmly and securely to the movable actuator shaft 20. The movable push plate 34 has a movable pry member 42 that extends outwardly from the movable push plate 34 and, in the exemplary embodiment, the movable pry member 42 is bifurcated, having two prongs 44 with a space 46 therebetween. Both of the prongs 44 taper inwardly in the outer direction and, as with the fixed pry member 30, the taper may be on the side of the prongs 44 facing the power actuator 12, facing away from the power actuator 12, or on both sides of the prongs 44.

Figure 2:
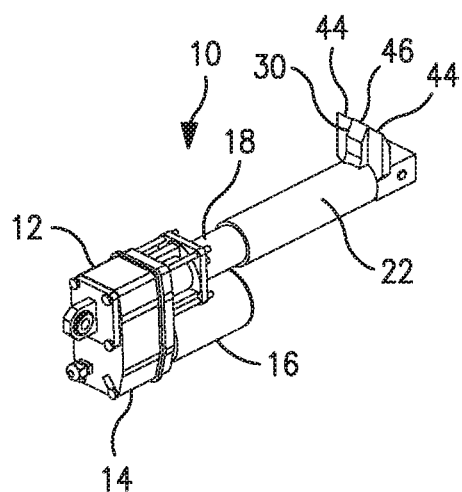
FIG. 2 is a perspective view of the power door opener of FIG. 1.

Turning then to FIG. 2, taken along with FIG. 1, there is shown a perspective view of the power door opener 10 with the actuator shaft 20 in the closed position. As can be seen, the fixed pry member 30 aligns with the two prongs 44 of the movably pry member 42 since the fixed pry member 30 occupies the space 46 intermediate those prongs 44. As such, there is formed a continuous edge by the combination and alignment of the fixed pry member 30 and the movable pry member 42.

Figure 3:
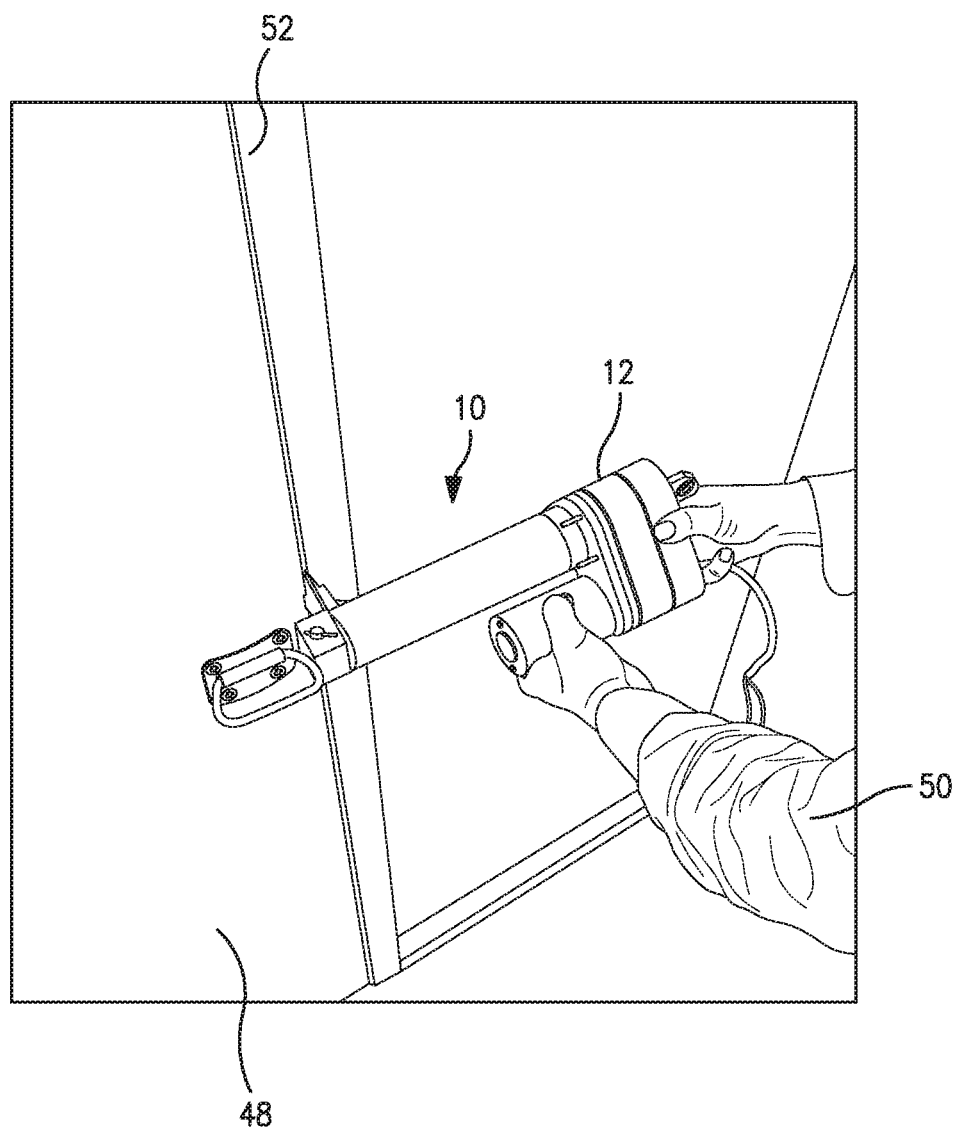
FIG. 3 is a view illustrating the use of the FIG. 1-2 embodiment.

Turning then to FIG. 3, taken along with FIGS. 1 and 2, there is a view of the present power door opener 10 and illustrating its use to force open a door 48. In FIG. 3, the user 50 has inserted the continuous edge of the power door opener 10 into the narrow space between the door 48 and the door jamb 52.

As such, as electricity is fed to the motor 16 of the power actuator 12, the actuator shaft 20 will move outwardly with respect to the housing 14. The outward movement of the actuator shaft 20 will create an ever increasing space between the fixed pry member 30 and the movable pry member 42 to force the opening between the door 48 and the door jamb 52 to expand to eventually reach a linear gap where the lock or door latch will be clear of the door jamb 52. At that point, the door 48 can be opened and access gained to the interior of the building or room.

Figure 4:
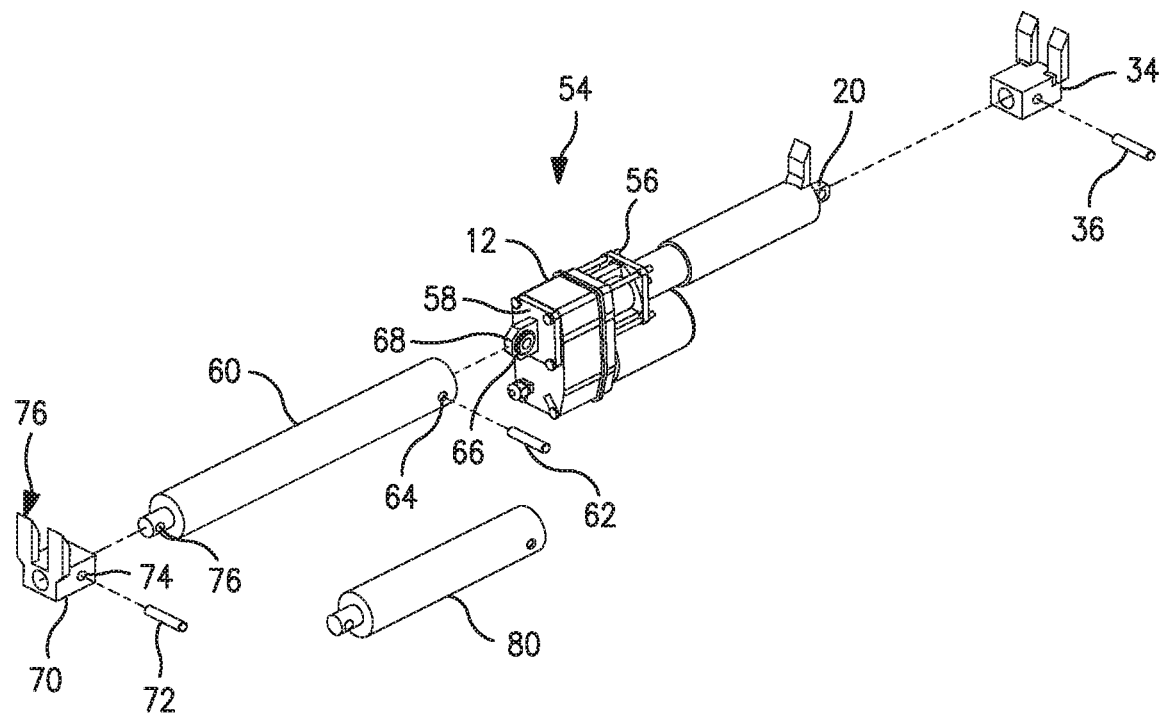
FIG. 4 is an exploded view of an alternate exemplary embodiment of the power door opener of the present invention.

Turning next to FIG. 4, there is shown an exploded view of an alternative exemplary embodiment of the present invention and showing the double ended power door opener 54.

With the FIG. 4 embodiment, the power actuator 12 is basically the same as that described with respect to FIGS. 1-3 and the same identification numbers are with the FIG. 4 embodiment for the same components.

However, in the present embodiment the double ended power door opener 54 is designed for forcing open a door by a different method. With the FIG. 4 embodiment, the power actuator 12 has a front side 56 and a rear side 58. As with the FIG. 1 embodiment the movable actuator shaft 20 extends out of the front side 56 of the power actuator 12 and there is, again, a movable push plate 34 affixed to the outer end of the actuator shaft 20 and has a movable pry member 42.

In this embodiment, however, the movable push plate 34 is reversed such that the bifurcated movably pry member 42 faces outwardly and therefore does not align with the fixed pry member 30 when the actuator shaft 20 is in the closed position. The orientation of the movable push plate 34 can be established by its affixation to the outer end of the actuator shaft 20 with pin 36.

Affixed to the rear side 58 of the power actuator 12 is a long extension 60 and the long extension 60 can be affixed to the power actuator 12 by means of a pin 62 that passes through an opening 64 in the long extension 60 and also through an opening 66 formed in a connector 68 that is affixed to or a part of the power actuator 12.

As such, the long extension 60 is firmly affixed to the rear side 58 of the power actuator 12 and there is an extension push plate 70 affixed to the free end of the long extension 60. Again, the connection between the extension push plate 70 and the long extension 60 may be by means of a pin 72 passing through an opening 74 in the extension push plate 62 and a hole 76 formed in the free end of the long extension 60.

The extension push plate 70 also includes an extension pry member 78 that, again, may be bifurcated in a similar manner to the movable pry member 42 (FIG. 1). There may also be as short extension 80 that is provided so that the user can install the short extension 80 as an alternative to the long extension 60 depending on the width of the doorway that is to be distorted in forcing a door open. As can be readily seen, the short extension 80 can be installed and affixed to the power actuator 12 in the same manner as the long extension 60 and the only difference is that the overall length of the double ended power door opener 54 is different.

Figure 5:
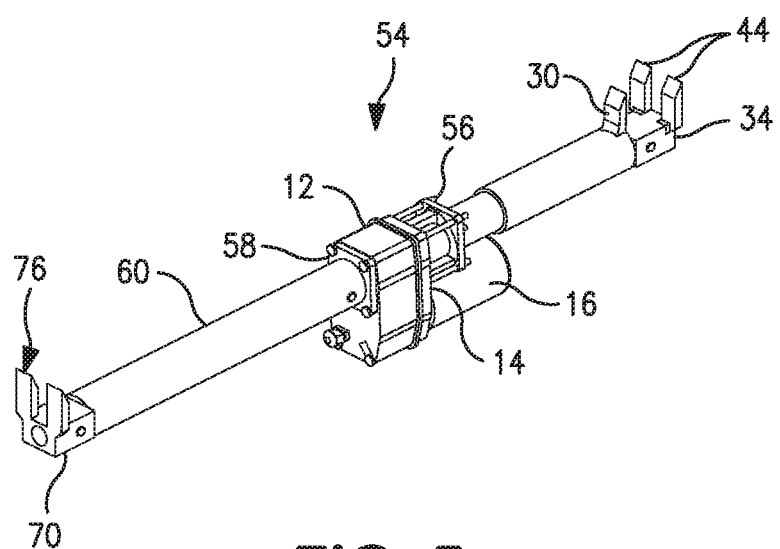
FIG. 5 is a perspective view of the power door opener of FIG. 4.

Turning then to FIG. 5, there is shown a perspective view of the double ended power door opener 54 of FIG. 4. As can be seen, the double ended power door opener 54 includes the extension push plate 70 at one end of the double ended power door opener 54 with the movable push plate 34 at the other end with a known linear distance therebetween. As such, that linear distance can be changed by activating the power actuator 12 so as to move the actuator shaft 20 to extend outwardly or retract inwardly with respect to the housing 14.

Accordingly, as will become clear, the double ended power door opener 54 can be placed in a doorway between two vertical door jambs and with the actuator shaft 20 in the closed position. Upon activation of the power actuator 12, the movable push plate 34 can be extended outwardly to increases the linear distance between the extension push plate 70 and the movable push plate 34 to spread the door jamb to release the door to be forced open.

Figure 6:
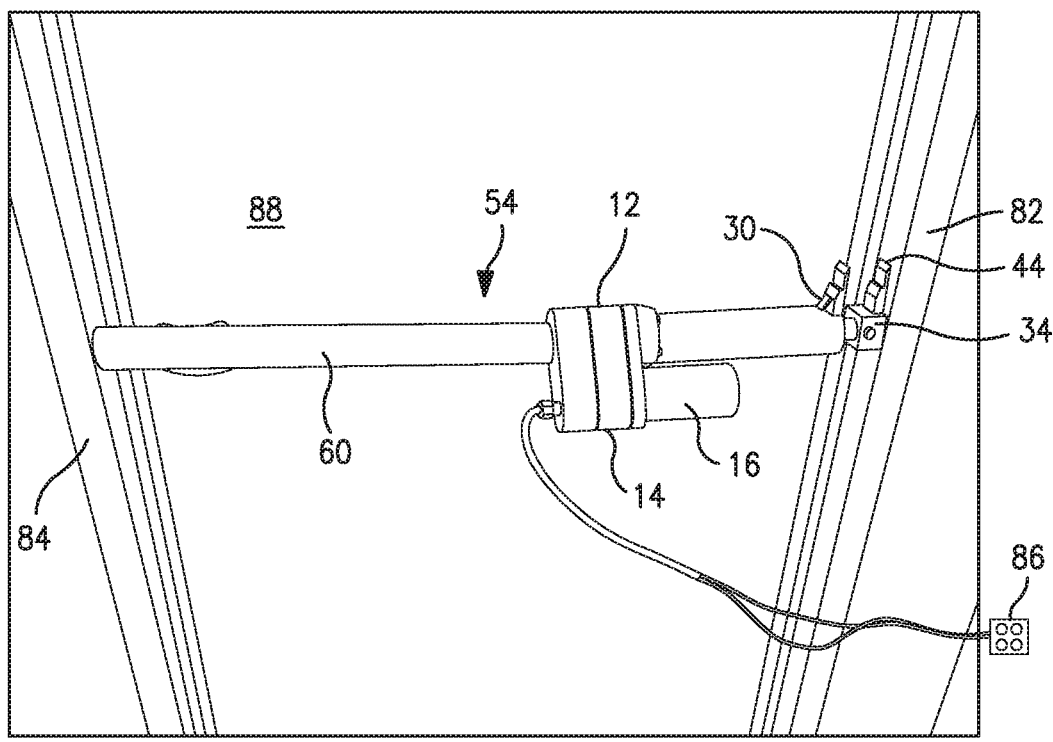
FIG. 6 is a view illustrating the use of the FIG. 4-5 embodiment.

That action is illustrated in FIG. 6, taken along with FIGS. 4 and 5, where the double ended power door opener 54 is shown in operative position intermediate opposed door jambs 82, 84. As can be seen, the movable push plate 34 is fitted against the door jamb 82 while the free end of the long extension 60 is fitted against door jamb 84. In this embodiment, a remote controller 86 is connected to the power actuator 12 so that the user can be positioned away from the doorway when the door is forced open. As such, the user can be protected by the walls that surround the door 88 and not be in the way of possible danger that may be present within the room being entered.

Accordingly, by activating the power actuator 12, the door jambs 82, 84 will be spread apart as the actuator shaft 20 moves from a closed position to an extended position, thereby freeing the lock from its connection to a door jamb and allow the user to force the door open for access to the room.

While the present invention has been set forth in terms of a specific embodiment or embodiments, it will be understood that the present power door opener herein disclosed may be modified or altered by those skilled in the art to other configurations. Accordingly, the invention is to be broadly construed and limited only by the scope and spirit of the claims appended hereto.

What is claimed is:

1. A power door opener comprising:
    an electric power actuator including a housing, an actuator shaft extending from the housing, and an electric motor adapted to selectively dispose the actuator shaft in either one of closed and extended positions, wherein the actuator shaft extends linearly outwardly from the housing when disposed in the extended position;
    a movable push plate coupled to an end of the actuator shaft in either of first and second orientations, wherein the movable push plate includes a movable pry member that extends outwardly from the movable push plate; and
    a fixed push plate having first and second opposing ends, wherein the first end is coupled to the housing of the electric power actuator, wherein a fixed pry member is disposed proximate the second end and extends outwardly from the fixed push plate, and wherein when the movable push plate is coupled to the end of the actuator shaft in the first orientation, the movable and fixed pry members cooperatively form a substantially continuous edge when the actuator shaft is disposed in the closed position, and when the movable push plate is coupled to the end of the actuator shaft in the second orientation, the movable and fixed pry members do not form the substantially continuous edge when the actuator shaft is disposed in the closed position.

2. The power door opener of claim 1, wherein the electric motor is controlled by a remote controller.

3. The power door opener of claim 1, further comprising an extension removably coupled to the electric power actuator.

4. The power door opener of claim 3, wherein the extension includes an extension push plate disposed at a distal end of the extension.

5. The power door opener of claim 3, wherein the extension is selected from a plurality of extensions having respective lengths.

6. The power door opener of claim 1, wherein the movable push plate is removably coupled to the actuator shaft.

7. The power door opener of claim 1, wherein the movable pry member is bifurcated to form an opening, and
    wherein when the movable push plate is coupled to the end of the actuator shaft in the first orientation, the fixed pry member is adapted to be disposed in the opening when the actuator shaft is in the closed position to form the substantially continuous edge.

8. The power door opener of claim 7, wherein the fixed pry member is tapered from the substantially continuous edge on a side of the fixed pry member facing the electric power actuator, and the movable pry member is tapered from the substantially continuous edge on a side of the movable pry member facing away from the electric power actuator.

9. The power door opener of claim 1, wherein the electric power actuator includes a gear mechanism adapted to be driven by the electric motor to cause selective movement of the actuator shaft between the closed and extended positions.

10. A method of opening a door using a power door opener having an electric power actuator, an actuator shaft extendable from the power actuator and being selectively movable between closed and extended positions, and an electric motor adapted to move the actuator shaft between the closed and extended positions, the method comprising:
    coupling a movable push plate to an end of the actuator shaft in either of first and second orientations, wherein the movable push plate includes a movable pry member that extends outwardly from the movable push plate, wherein the power door opener includes a fixed push plate having first and second opposing ends, wherein the first end is coupled to the housing of the electric power actuator, a fixed pry member is disposed proximate the second end and extends outwardly from the fixed push plate, and wherein when the movable push plate is in the first orientation, the movable and fixed pry members cooperatively form a substantially continuous edge when the actuator shaft is disposed in the closed position, and when the movable push plate is in the second orientation, the movable and fixed pry members do not form the substantially continuous edge when the actuator shaft is disposed in the closed position;

when the movable push plate is disposed in the first orientation, inserting the substantially continuous edge into a space formed between the door and a door jamb; and activating the electric motor to move the actuator shaft to the extended position to cause the movable push plate to move in a direction away from the fixed push plate and the housing, thereby widening the space between the door and the door jamb to release the door from the door jamb.

11. The method of claim 10, wherein the step of activating the electric motor includes using a remote controller to activate the electric motor.

12. The method of claim 10, further comprising removably coupling an extension to the electric power actuator.

13. The method of claim 12, further comprising positioning the power door opener between opposing door jambs with a distal end of the extension contacting one of the door jambs and the movable push plate contacting the opposing door jamb; and wherein step of activating the electric motor further causes the movable push plate to move away from the distal end.

14. The method of claim 12, further comprises selecting the extension from a plurality of extensions.

15. The method of claim 10, wherein the movable pry member is bifurcated to form an opening, and wherein when the movable push plate is coupled to the end of the actuator shaft in the first orientation, the fixed pry member is adapted to occupy the opening when the actuator shaft is in the closed position to form the substantially continuous edge.

16. The method of claim 15, wherein the fixed pry member is tapered from the substantially continuous edge on a side of the fixed pry member facing the electric power actuator, and the movable pry member is tapered from the substantially continuous edge on a side of the movable pry member facing away from the electric power actuator.

17. The method of claim 10, wherein activating the electric motor includes driving a gear mechanism of the electric power actuator by the electric motor.

* * * * *